Oct. 14, 1958 A. W. WIRTANEN ET AL 2,856,604

ANTENNA

Filed Dec. 24, 1953 3 Sheets-Sheet 1

*INVENTOR.*
ALBERT W. WIRTANEN
AXEL M. WIRTANEN
*BY* Richard P. Carden
AGENT

Oct. 14, 1958 A. W. WIRTANEN ET AL 2,856,604

ANTENNA

Filed Dec. 24, 1953 3 Sheets-Sheet 2

INVENTOR.
ALBERT W. WIRTANEN
AXEL M. WIRTANEN

BY Richard P. Carden

AGENT

Oct. 14, 1958 A. W. WIRTANEN ET AL 2,856,604

ANTENNA

Filed Dec. 24, 1953 3 Sheets-Sheet 3

INVENTOR.
ALBERT W. WIRTANEN
AXEL M. WIRTANEN
BY
Richard P. Cardew
AGENT

United States Patent Office 2,856,604

Patented Oct. 14, 1958

2,856,604

ANTENNA

Albert W. Wirtanen, Iron, and Axel M. Wirtanen, Eveleth, Minn.

Application December 24, 1953, Serial No. 400,174

4 Claims. (Cl. 343—806)

This invention relates to an antenna especially adapted for use with television receivers, especially in the so-called fringe areas.

The difficulties of television transmission are well known, as are the difficulties of receiving television signals in the so-called fringe areas. The strength of the television signal is dissipated rapidly as far as distance is concerned because of the fact that television signals tend to travel in a straight line from their point of transmission and do not tend to follow the earth's curvature, these signals are not reflected or bent as easily as common low-frequency waves are by the upper layers of air to be returned to the earth.

There has been a continued search for a television receiving antenna which is capable of picking up a maximum amount of the very weak television signals and conveying them to the television receiver with a minimum of loss of signal strength between the time it is picked up by the antenna and is induced into the receiver. Many different designs of television antenna are on the market, some of them are better than others for the intended purpose, however, there is still a need for a better antenna for television receivers.

Many of the antennas now in common use in fringe areas have a narrow band of selectivity, that is, the antenna may be best suited for one particular channel and may be capable of receiving, with a lesser degree of gain, possibly two or three channels on either side of the predetermined base channel for which the antenna is designed. This makes it necessary for one to purchase more than one antenna if he wishes to receive channels on one end of the spectrum as well as the other. This is, of course, expensive, and requires more paraphernalia than is practical for a home installation.

Most of the television antennas now in common use extend horizontally from the mast on which they are carried and are pointed in the direction from which the signal is strongest.

It is one of the principal objects of this invention to provide a television antenna which has a high gain whereby it will be efficient for use in so-called fringe areas and at the same time may be used for picking up local stations.

Another object of this invention is to provide an antenna which has a wide band of selectivity whereby it will be more efficient in picking up stations which have a greater differential of frequency than presently known antenna are capable of doing while maintaining a relatively high gain.

Another object of this invention is to provide an antenna which is normally vertically disposed when in use, thereby to provide for instantaneous pickup of a signal over the entire effective length of the antenna.

Another object is to provide a television antenna having effective sections arranged in opposed relation to each other, the sections being joined to form a plurality of complete loops or circuits which are balanced.

Another object is to provide such an antenna which may be stacked, or doubled both vertically and horizontally as driven elements if desired, and wherein reflectors may be used.

These and other objects and advantages of this invention will become more apparent as the description proceeds.

In the accompanying drawing forming a part of this application:

Figure 1:
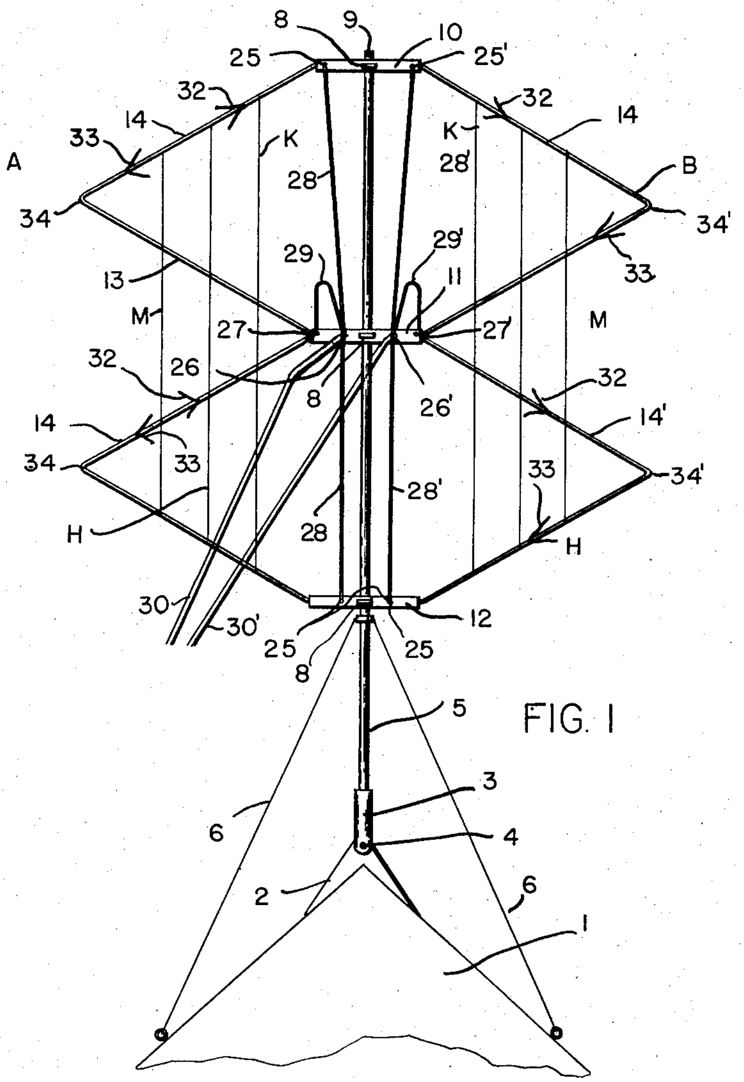
Fig. 1 is a front elevational view of an antenna made in accordance with our invention.

In the drawing the reference numeral 1 indicates the roof of a building which forms a conventional location for mounting a mast base 2 having a mast socket 3 pivotally mounted thereon as at 4 to receive mast 5. Guy wires 6 are employed to brace the mast in vertical position after the antenna has been mounted thereon. The mast 5 may be of wood or metal. Any suitable connection, not shown, may be employed to secure the mast 5 in the socket 3.

As means for mounting the effective antenna on the mast there are provided a plurality of spaced cross arms, preferably three, bearing numerals 10, 11 and 12, the upper arm 10 being adjacent the top 9 of the mast intermediate arm 11 being centrally located between the upper arm 10 and the lower arm 12, the latter arm being spaced from the arm 11 the same distance as the arm 10 is spaced from the arm 11. In other words, the arms are equi-distant apart. The arms are carried in parallel relation to each other in horizontal as well as the vertical plane and are secured to the mast by means of a U-bolt 8, or the like. The arms 10, 11 and 12 may be of wood fiber, or similar nonconducting material to insulate the connections of the antenna from the mast 5 and from each other.

The antenna, generally designated by the numeral 13, is composed of suitable metallic material such as aluminium wire or rod, copper wire, or the like, however, an aluminium rod about one-quarter inch in diameter is preferred for the major portion of the antenna because of its lightweight and self-supporting qualities, as well as its ability to pick up and carry television signals. The antenna is installed on the cross arms on the mast in a predetermined form, the length of rod or wire used being predetermined, of course, as are the lengths of the individual segments of the antenna.

Figure 5:
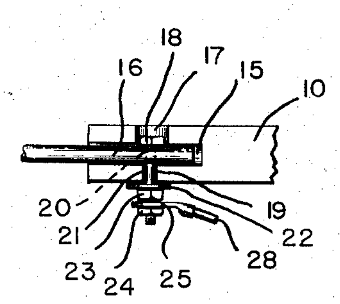
Fig. 5 is a sectional view through a mounting arm showing the manner in which the connections are made.
Figure 6:
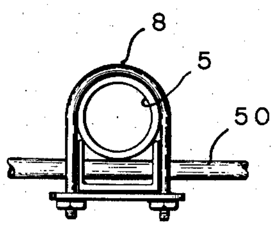
Fig. 6 is a sectional view of an antenna mast showing the manner in which the horizontal stacking arrangement, as shown in Fig. 4, is mounted on the mast.

The basic antenna, as shown in Fig. 1, is made up of four V-shaped segments, indicated by the numeral 14 and arranged in two opposed W-shaped sections A and B. The open ends of the V-shaped segments are anchored in suitable mounting means in the cross arms 10, 11 and 12, as shown to provide the W-shape of the sections A and B. The preferred manner of securing the ends of the sections 14 in the insulator arms is shown in Fig. 5, and comprises an opening 15 extending longitudinally into each of the ends of each of the arms 10, 11 and 12 providing a socket into which the end 16 of each leg of the V-shaped segments 14 may be inserted. The arms 10, 11 and 12 are cross-bored providing a transverse opening communicating with the opening 15. The transverse opening includes a relatively large opening 17 on one side of the opening 15 into which the head 18 of a bolt 19 may be carried so as to butt against the end 16 of the leg. The end 16 of the leg has a suitable opening, suggested at 20 to receive the bolt 19 therethrough, and the cross arms have a relatively small opening 21 on the opposite side of the opening 15 from the head of the bolt, to receive the body of the bolt 19. The bolt is of sufficient length to extend through the cross arms as shown in Fig. 5 so that a washer 22 and nut 23 may be mounted thereon to securely bind the end 16 within the opening or socket 15 and to provide an electrical connection between the end 16 of the sections 14 and the bolt 19. Other electrical connections may thus be made on the bolt 19 by the addition of a clamping nut 24 on the bolt after the connection 25 has been mounted on the extending end of the bolt. At the cross arm 11 the ends 16 of the rod are connected together by providing a wider opening 15 and a longer bolt which will pass through the end 16 of each of the sections 14.

Figure 3:
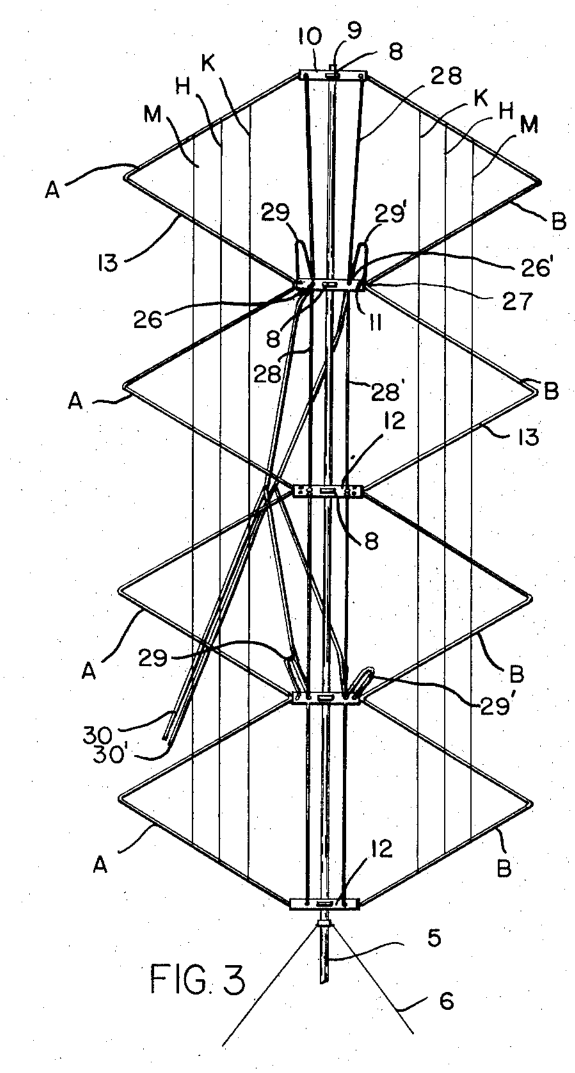
Fig. 3 is a view similar to Fig. 1 but illustrating a vertically stacked arrangement of our antenna.
Figure 4:
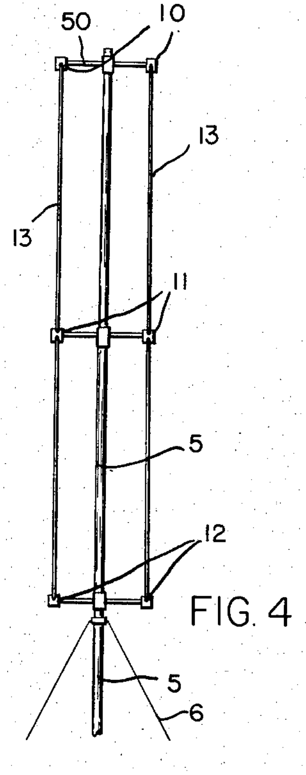
Fig. 4 is a side elevational view of an antenna such as is shown in Fig. 1, illustrating two antennas mounted one behind the other, the rear one serving as either a driven or a reflector, according to the manner in which the lead-ins are connected.

On the arm 11 a pair of lead-in tap locations are provided, one on each side of the mast, No. 26 on one side of the mast and 26' on the other. The connections 26 are located, preferably, between the mast and the connection 27 of the center of the sections A and B to the arm 11, as shown. Each of the legs of the sections A and B are of the same predetermined length, the length being predetermined by the basic frequency for which the antenna will be designed. The legs of the sections A and B are preferably one-half wave length long. For example, for television channel 5 the legs would be substantially seventy-four inches long. The W-shape of each section, when composed of seventy-four inch legs, will result in a channel 5 one-quarter wave spacing of 34 inches between the adjacent legs of the sections on a line drawn through the midpoint of each of the legs, see line H, Fig. 1. Thus there are three adjacent and alined one-quarter wave spacings between the legs forming a most resonant point of the band on each side of the mast. As shown in Fig. 3, there are seven one-quarter wave adjacent and alined segments on each side of the mast which are resonant when two antennas are stacked vertically.

Figure 7:
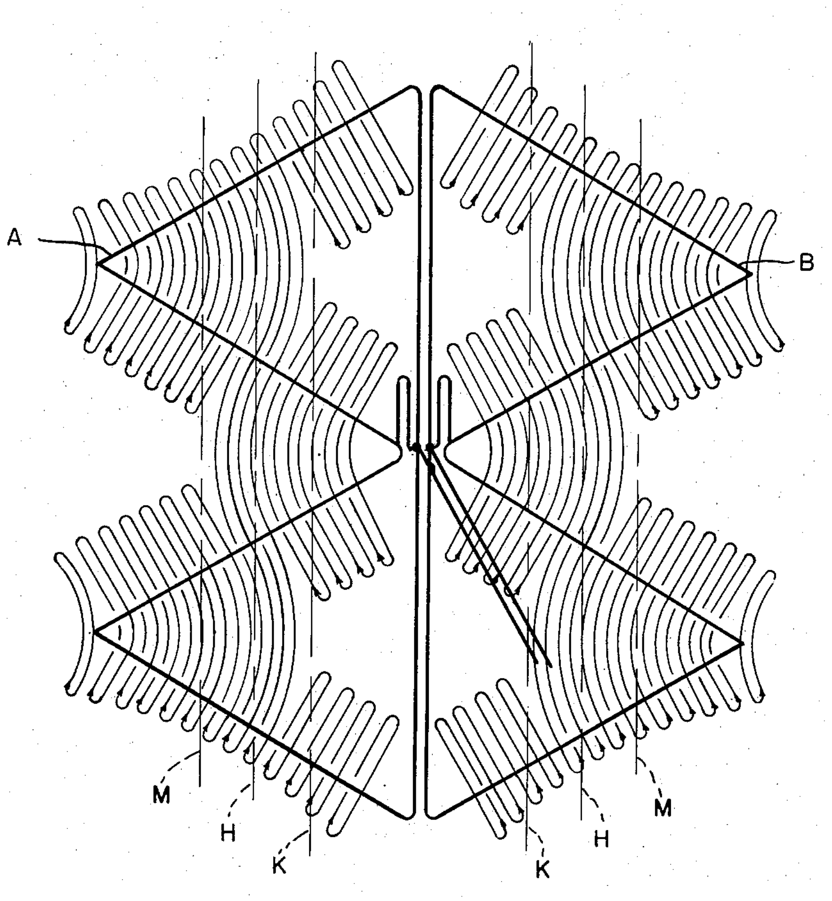
Fig. 7 is a diagrammatic view showing the pattern of the lines of flux at an instantaneous value on the antenna.

As shown in Fig. 7, the magnetic lines of force present around each of the legs will join over the most resonant point of the sections and over an area on both sides of the line H (see lines K and M), the extent of the joining of the lines of force being dependent on the frequencies involved and strength of the signal being received. On each side of the most resonant line H of the mast the antenna will resonate, to a lesser degree, of course, however, the specific disposition of the legs of each W-shape relative to each other and the specific relation of the two opposed W-shaped sections A and B facilitates the highly efficient operation of the antenna on both sides of the specifically resonant frequency, as will become apparent. The W-shaped sections are mounted vertically on opposite ends of the cross arms, the sections being oppositely disposed, or, in other words, the open ends of the W's face each other and the apexes of the V's are outwardly disposed. To facilitate the description, the sections on one side of the mast will carry a prime symbol after their reference numerals to indicate corresponding parts on the opposite side of the mast.

An electrical conductor or riser member 28 is connected between the bolts 19 on the cross arms 10 and 12, which form the connection 25, and the antenna lead-in connection 26, as shown, whereby a complete circuit or loop is provided on each side of the mast, the loop being made up of the W-shaped section and the conductors 28 extending between the remote ends of the sections. In addition, a phasing element 29, comprising an electrical conductor, is provided in the form of a loop extending between the connections 27 and 26 as shown. The phasing element 29 is shorter than the legs, and is preferably between one-quarter and two-thirds as long as the legs.

The antenna lead-in is composed of a pair of wires 30 and 30' which are connected to the connections 26 and 26', respectively, as shown, which form the electrical midpoint or center of each of the antenna sections A and B. The lead-in 30 is connected to the television receiving apparatus, not shown, through any suitable conventional lead-in cable, as in the lead-in 30'. A conventional arrangement within the television receiver is to have an antenna coil, one of the lead-in wires being connected to each end of the antenna coil as is well known in the art. This arrangement provides a complete electrical circuit between each of the opposed antenna sections, the antenna coil having a secondary coil into which the signal is induced, there being adjustable means such as a variable condenser, connected to the secondary coil to tune the circuit to a desired frequency to be received. The antenna sections, of course, are similar electrically and physically, as shown, to provide for balance in the circuit.

Figure 2:
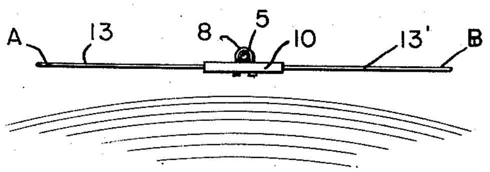
Fig. 2 is a top plan view of Fig. 1 showing the manner in which the signal is received by the antenna, the arc of the waves being exaggerated for illustration purposes.

In operation the mast 5 is held in vertical position with the antenna loops A and B facing normal to the direction from which the signal is being received, see Fig. 2. As the signal is impressed on the antenna, it will be readily seen that the lines of flux in the antenna sections A and B will be in the same direction at a given instant. However, because of the opposed relationship of the loops A and B, when a positive potential is present at lead-in connection 26 a negative or less positive potential will be present at connection 26', and vice versa. For example, when the current flows in the direction of arrow 32 the connection 26 might be positive while the connection 26' would then be negative. When the current flows in the direction of arrow 33 the connection 26 would be negative and connection 26' would be positive. Thus, there is a difference in potential between the connections 26 and 26', and current will flow between the sections A and B through the lead-in wires 30 and 30' after passing through the antenna coil, not shown, within the television receiver. Thus the signal is carried from the antenna to the receiver and effective use of the signal will be made by the receiver as it passes through the antenna coil. In the antenna as above described, the W-shaped sections resonate pick up the signal, and the conductors 28 carry same to the lead-ins, permitting current to flow in a complete circuit in either direction in the antenna sections.

In the above described antenna, the capacitant reactance equals the inductive reactants at various frequencies, in turn creating a resonance or tuned circuit, at various frequencies, between the two sections. The relation of the specifically arranged and connected legs of the opposed W-shaped sections is such as to expose more area or create more effective capacity between the resonance point of the opposed sections as the resonant frequency selected decreases, causing the resonance points of the opposed sections to move apart from the lines K to *m* as shown in Fig. 1.

Having thus described our invention, what we claim is:

1. An antenna for picking up high frequency signals to activate an antenna coil of a receiver comprising: a pair of similar sections made of electrical conductor material and arranged in spaced opposed relation to each other, each of said sections having at least four connected legs of substantially equal length, adjacent legs being oppositely inclined forming a substantially W-shape, the angles between adjacent legs being substantially the same and of such a degree that the spacing between the legs at about their center points is substantially equal, electrical conductors connecting the outer ends only of each of said sections forming risers and providing a closed circuit in each loop, a lead-in conductor connected to each of said risers at substantially the electrical mid-point of each of said sections, and a phasing loop for each of said sections connected between the center of the W-shape of said sections and the connection of said lead-in to the center of said riser on each respective one of said sections.

2. The structure as set forth in claim 1 and said phasing loop being shorter than said legs.

3. An antenna comprising a pair of sections, said sections each including an electrical conductor formed to a W-shape, an electrical conductor riser member connected to outer ends only of said W-shaped conductor providing a closed circuit in said sections, a phasing element connected at one end to the mid-point of said W-shape and at its opposite end to the center of said riser member, said sections having legs of substantially equal length, adjacent legs being arranged in similar angular relation to each other, said phasing element being shorter than said legs, and a lead-in connected to the center of said riser member, said sections being arranged in opposed relationship to each other whereby said sections balance each other in operation.

4. An antenna comprising a pair of sections, said sections each including a pair of similar V-shaped conductor segments electrically connected at adjacent ends and providing V-shaped spaces therebetween of similar but reversed shape to form a W-shape, an electrical conductor riser member connected to the outer end only of said W-shaped conductor providing a closed circuit in said sections, a phasing element for each of said sections connected at one end to the mid-point of said W-shape of each section and at its opposite end to the center of its respective one of said riser members, said sections having legs of substantially equal length and adjacent legs being arranged in similar angular relation to each other, said phasing element being shorter than said legs, and a lead-in connected to the center of each riser member, said sections being arranged in opposed relationship to each other whereby said sections balance each other in operation.

References Cited in the file of this patent

UNITED STATES PATENTS

| | | |
|---|---|---|
| 2,140,145 | Sterba | Dec. 13, 1948 |
| 2,486,872 | Parker | Nov. 1, 1949 |
| 2,528,400 | Trowbridge | Oct. 31, 1950 |